April 14, 1964      J. GABLER      3,128,923

CONTAINER FOR RECEIVING AND DELIVERING PASTY SUBSTANCES

Filed March 6, 1962

United States Patent Office 3,128,923
Patented Apr. 14, 1964

3,128,923
CONTAINER FOR RECEIVING AND DELIVERING PASTY SUBSTANCES
Josef Gabler, Mainaustrasse 44, Zurich 8, Switzerland
Filed Mar. 6, 1962, Ser. No. 177,874
1 Claim. (Cl. 222—390)

The present invention relates to a container for receiving and delivering pasty substances, for example cosmetic or other creams, pasty foodstuffs, spices, etc.

Containers of this kind, with an outer container with lower portion and cover, and with an inner container serving for receiving the substance and provided on its inner wall with screw-thread, and with a piston-head adjustable by means of this screw-thread and coupled to the bottom of the outer casing by a compression spring, are already known in many forms of execution.

The invention relates to a container of this kind, in which on the upper edge of the inner container a closing wall is provided with an outlet opening for dispensing the substance in the container and has a free peripheral edge projecting beyond the periphery of the inner container. This edge serves to turn the inner container carried rotatable in the outer container, in order to displace axially the piston-head connected to the bottom of the outer container by a compression spring.

Figure 1:
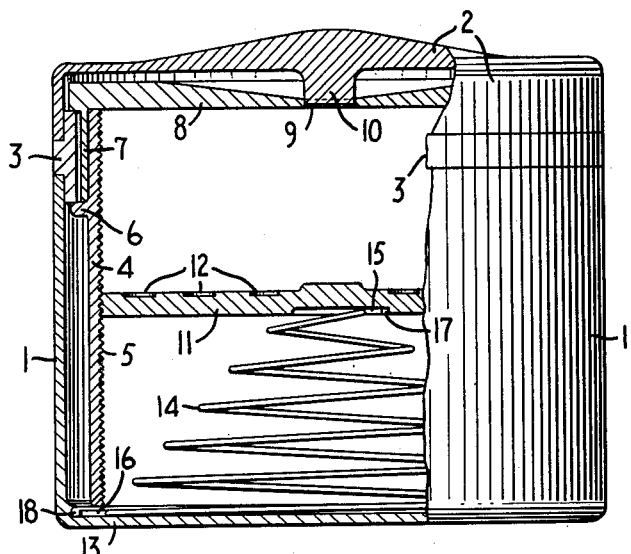
Figure 2:
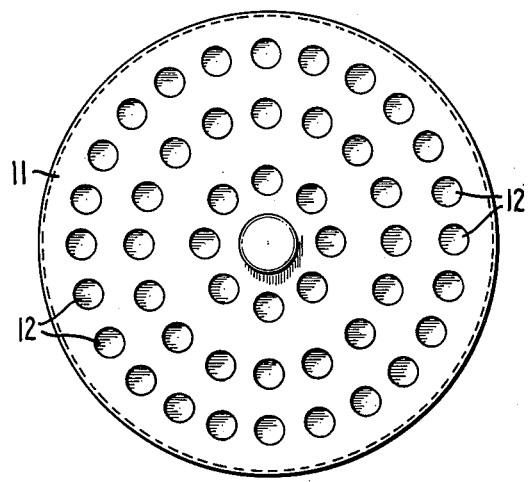

One example of execution of the object of the invention is represented in the accompanying drawing, in which:

FIG. 1 shows the container, partly in axial section, and
FIG. 2 a view looking down on a part of FIG. 1.

The container shown in the drawing has the lower portion 1 of the outer container with the cover 2, whereby this cover 2 can be set onto a ring 3 arranged between the lower portion 1 and the cover. The inner diameter of the ring 3 is smaller than the inner diameter of the lower portion 1.

An inner container 4 comprises a tubular member with the screw-thread 5 on its inner wall surface. The tubular member is provided with an annular rim or bulge 6 as stop for the lower side of the ring 3.

An axially running tubular socket 7 on a closing wall 8 can be pushed onto the upper edge of the inner container 4. The closing wall has an outlet opening 9 for a pasty substance filled into the inner container 4. On the lower side of the cover 2 a central projection 10 is provided, which closes the outlet opening 9 in the closing wall 8 when the container is closed.

The free peripheral edge of the closing wall 8 projects radially over the inner container 4.

The piston-head 11 (FIG. 2), displaceable along the screw-thread 5 on the inner container 4, is provided on its upper side with recesses 12.

Between the bottom 13 of the lower portion 1 of the outer casing and the piston-head 11 a taper compression spring 14 is arranged, whose ends 15 and 16 are bent out radially and rest in radially incisions 17 and 18 in the casing-bottom 13 and piston-head 11 respectively.

The inner container 4, filled with a pasty substance, is pushed into the lower portion 1 of the outer container thereby pressing the spring 14 together; then the ring 3 is laid into the lower portion 1 and cemented or soldered to it, depending on the material of which the container is made. Finally the closing wall 8 is placed onto the inner container, and the cover 2 onto the lower portion 1 of the outer container.

For taking the pasty substance out of the inner container 4 through the delivery opening 9 in the closing wall 8, the cover 2 is removed from the lower portion 1 and/or from the ring 3.

With the lower portion 1 held firmly, the inner container 4 is turned by holding the closing wall 8 on the periphery and turning it. The spring 14 at the same time prevents the piston-head 11 from turning, so that it is displaced in the screw-thread 5 on the inside of the inner container 4, upwards or downwards in accordance with the direction of turning of the closing wall 8. When the movement is upwards substance is pressed out through the outlet opening 9, whilst when the movement is downwards, the pasty substance is sucked back. During this downward movement of the piston-head 11, the recesses 12 cause the pasty substance to be carried with it.

What I claim is:

A container for receiving and dispensing a pasty substance comprising, an outer container having a lower portion and a cover, an inner container comprising a tubular member disposed internally of said outer container rotatable therein and having a threaded inner wall surface, a piston disposed internally of said inner container tubular member and having complementary threads engaging with said threaded inner surface for axial movement relative to said tubular member of said inner container, a compression spring coupled to said piston and coupled to the bottom of said outer container, means defining an upper wall covering said tubular member of said inner container and having an outlet opening for dispensing said pasty substance, said means defining said upper wall comprising an outer free surface for rotating said inner container within said outer container upon removal of said cover on said outer container, a ring disposed between said lower portion of said outer container and said cover thereof, said ring having an annular portion extending into said outer container, and said inner container having an annular rim abutting the underside of said portion of said ring.

References Cited in the file of this patent

UNITED STATES PATENTS

| 691,935 | Eaton | Jan. 28, 1902 |
| 964,451 | O'Byrne | July 12, 1910 |
| 2,635,789 | Gabler | Apr. 21, 1953 |

FOREIGN PATENTS

| 650,054 | Great Britain | Feb. 14, 1951 |
| 728,945 | France | Apr. 19, 1932 |